(12) United States Patent
Sen

(10) Patent No.: US 11,472,643 B1
(45) Date of Patent: Oct. 18, 2022

(54) GRAIN DRYER

(71) Applicant: Johnny F. Sen, Innisfree (CA)

(72) Inventor: Johnny F. Sen, Innisfree (CA)

( * ) Notice: Subject to any disclaimer, the term of this patent is extended or adjusted under 35 U.S.C. 154(b) by 0 days.

(21) Appl. No.: 17/841,409

(22) Filed: Jun. 15, 2022

Related U.S. Application Data

(60) Provisional application No. 63/294,576, filed on Dec. 29, 2021.

(51) Int. Cl.
*B65G 65/46* (2006.01)
*F26B 21/04* (2006.01)
*F26B 17/12* (2006.01)

(52) U.S. Cl.
CPC .......... *B65G 65/466* (2013.01); *F26B 17/122* (2013.01); *F26B 21/04* (2013.01); *B65G 2812/0577* (2013.01)

(58) Field of Classification Search
CPC .......... B65G 65/466; B65G 2812/0577; F26B 17/122; F26B 21/04; F26B 17/18; F26B 3/00; B02B 1/08
See application file for complete search history.

(56) References Cited

U.S. PATENT DOCUMENTS

| | | | | |
|---|---|---|---|---|
| 2,498,573 A | * | 2/1950 | Ozai-Durrani | B02B 1/08 426/461 |
| 2,790,563 A | * | 4/1957 | Mccarthy | B65G 65/466 414/312 |
| 2,887,788 A | * | 5/1959 | Baxter | F26B 11/0413 34/182 |
| 3,016,626 A | * | 1/1962 | Kompus | F26B 3/00 34/224 |
| 3,531,872 A | * | 10/1970 | Watson | F26B 3/00 210/781 |
| 3,700,179 A | * | 10/1972 | Van Peursem | B65G 33/00 198/545 |
| 3,755,918 A | * | 9/1973 | Parrot | B65G 69/00 34/236 |
| 3,905,127 A | * | 9/1975 | Davis | F26B 17/20 432/112 |
| 3,913,239 A | * | 10/1975 | Burgin | F26B 3/00 34/174 |
| 4,033,466 A | * | 7/1977 | Easton | B65G 69/0433 414/302 |
| 4,038,021 A | * | 7/1977 | Benson | F26B 11/0445 432/118 |
| 4,135,308 A | * | 1/1979 | Benson | F26B 17/18 34/128 |

(Continued)

FOREIGN PATENT DOCUMENTS

CN 211953432 U * 11/2020
CN 212654997 U * 3/2021

(Continued)

*Primary Examiner* — Edelmira Bosques
*Assistant Examiner* — Bao D Nguyen
(74) *Attorney, Agent, or Firm* — Cramer Patent & Design, PLLC; Aaron R. Cramer

(57) ABSTRACT

A grain dryer is a system and means for drying grain having a grain conveyor and pair of blower motors. A first blower motor has a heat exchange while a second blower motor has a cool air exchange. A screen covers the conveyor to ensure the grains stay in position. Grain is moved along the system by means of an auger.

20 Claims, 6 Drawing Sheets

(56) References Cited

U.S. PATENT DOCUMENTS

| | | | | |
|---|---|---|---|---|
| 4,240,209 A * | 12/1980 | Cuthbertson | ............ | F26B 17/20 34/166 |
| 4,368,583 A * | 1/1983 | Bauermeister | .......... | F24S 10/50 126/674 |
| 4,599,809 A * | 7/1986 | Parkes | ..................... | A23B 9/08 34/535 |
| 4,603,775 A * | 8/1986 | Plett | ....................... | B65G 33/32 198/313 |
| 4,913,045 A * | 4/1990 | Satake | ..................... | B02B 1/06 99/611 |
| 4,963,066 A * | 10/1990 | Boppart | ................. | B65G 33/32 198/674 |
| 5,167,081 A * | 12/1992 | Loyns | ..................... | F26B 9/085 34/179 |
| 5,184,715 A * | 2/1993 | Feterl | .................... | A01C 15/003 198/667 |
| 5,251,385 A * | 10/1993 | Secor | ..................... | F26B 21/001 110/229 |
| 5,305,866 A * | 4/1994 | Stewart | .................. | B65G 65/22 198/314 |
| 5,318,444 A * | 6/1994 | Kuzub | .................... | B65G 33/32 198/315 |
| 5,409,344 A * | 4/1995 | Tharaldson | ............... | B60P 1/42 D15/27 |
| 5,492,217 A * | 2/1996 | Stewart | .................. | B65G 33/34 198/674 |
| 5,746,303 A * | 5/1998 | Niewold | ................ | B65G 33/24 198/594 |
| 5,788,055 A * | 8/1998 | Stewart | .................. | B65G 33/32 414/505 |
| 6,209,223 B1 * | 4/2001 | Dinh | ..................... | F26B 23/001 34/167 |
| 6,497,545 B1 * | 12/2002 | Simrose | ............... | B65G 65/466 414/326 |
| 7,191,889 B1 * | 3/2007 | Heley | ..................... | B65G 21/10 198/315 |
| 7,428,956 B2 * | 9/2008 | Scherman | ............ | A01C 15/003 198/312 |
| 7,708,131 B2 * | 5/2010 | Muth | .................... | B65G 41/002 198/315 |
| 7,946,416 B2 * | 5/2011 | Grose | .................... | B65G 47/18 198/312 |
| 8,118,151 B1 * | 2/2012 | Jesse | ...................... | B65G 33/14 198/315 |
| 8,272,494 B2 * | 9/2012 | Zazula | ................. | A01C 15/003 198/666 |
| 8,381,900 B1 * | 2/2013 | Hoogestraat | ........... | B65G 33/32 198/588 |
| 8,662,285 B2 * | 3/2014 | Jesse | ...................... | B65G 41/002 198/300 |
| 8,820,515 B2 * | 9/2014 | Houssian | ............... | A01D 57/00 198/666 |
| D722,738 S * | 2/2015 | Friesen | .......................... | D34/28 |
| 9,897,375 B2 * | 2/2018 | Thomas | ..................... | F26B 5/14 |
| 10,470,474 B2 * | 11/2019 | Valfiorani | ............... | F26B 25/22 |
| 10,525,483 B1 * | 1/2020 | Hill | ...................... | B02C 19/0043 |
| 2014/0041252 A1 * | 2/2014 | Vild | ........................ | F26B 21/04 34/500 |

FOREIGN PATENT DOCUMENTS

| | | | | |
|---|---|---|---|---|
| WO | WO-9300562 A1 * | 1/1993 | ............ | B04B 15/12 |
| WO | WO-9628253 A1 * | 9/1996 | ......... | B02C 19/0068 |

* cited by examiner

GRAIN DRYER

RELATED APPLICATIONS

None

FIELD OF THE INVENTION

The present invention relates generally to a dryer and more specifically to a dryer for grain.

BACKGROUND OF THE INVENTION

Product harvested by farmers all over the world include corn, soybeans, wheat, rice, rye, oats and the like. As such grains finish their growing cycle, they are harvested and stored until they can be processed. This storage process can take many steps as they move from the field to a cart, to a truck, to a temporary storage system, then again to a truck for longer term storage, and ultimately to a processing facility. Each of these steps allow the grain to gather moisture, perhaps as a result of condensation, exposure to weather, or the like.

Grains that are moist are difficult to transfer and may even freeze into a solid mass in the case of freezing temperatures. The use of grain drying systems helps to address these problems, but they are costly to operate and may require slow transfer speeds to ensure complete drying. All of these costs drive the overall cost of the grains up resulting in higher prices for all. Accordingly, there exists a need for a means by which grains can be dried in a cost-effective manner that addresses the above concerns. The development of the grain dryer fulfills this need.

SUMMARY OF THE INVENTION

The principles of the present invention provide for a grain dryer having a grain bin which is adapted to be supported on a ground surface—the grain bin has an interior holding a plurality of granular material, a swing auger which is a swing auger spiral vane traversing an exterior of a swing auger shaft between a first end and a second end of the swing auger shaft—the swing auger transfers the granular material from the grain bin to the grain dryer, a swing auger drive which operably communicates with the swing auger shaft, a swing auger platform which supports the swing auger and the swing auger drive that is adjustably supported to the ground surface via at least one swing auger support, a grain auger housing first portion which has a first end in environmental communication with a transition point and a second end in environmental communication with a first end of a heat or cool chamber, a second end of the heat or cool chamber is in environmental communication with a first end of a grain auger housing second portion, and a motor which is disposed within the heat or cool chamber—the motor is an integral part of the lower heating unit with fan blower.

The grain bin may include at least one grain bin wheel to move the grain bin. The swing auger shaft and the swing auger spiral vane may reside within a housing having an inlet in environmental communication with the interior of the grain bin and an outlet. The swing auger shaft first end may be in environmental communication with the interior of the grain bin. The housing of the swing auger spiral vane and the swing auger shaft second end may be in environmental communication with the grain dryer via the transition point. The swing auger may be portable.

The heat or cool chamber may be in-line with the grain auger housing first portion and the grain auger housing second portion. The grain dryer may comprise a lower heating unit with fan blower which may be attached to an upper side of the grain auger housing first portion and is in environmental communication with the heat or cool chamber. Attached on top of the grain auger housing first portion may be the lower heating unit with fan blower, which is in environmental communication with either the interior of the grain auger housing first portion, the interior of the heat or cool chamber, or both. The lower heating unit with fan blower may be attached to an intermediate location on an underside of the grain auger housing second portion and is in environmental communication with an interior thereof.

The grain dryer may be supported to a grain auger platform via a plurality of grain auger supports. The grain auger supports may include a plurality of trusses or a plurality of braces. The grain auger platform may include at least one grain auger wheel. The grain dryer may also have an air escape tunnel which may be located on top of a portion of the grain auger housing second portion and is in environmental communication with an interior thereof. The grain dryer may also have a cover that separates the air escape tunnel from the auger. The cover may be made of a mesh material to prevent material transfer of a plurality of large particles. The grain dryer may further comprise a series of outlet exhaust tubes located on either side of a divider wall.

The grain dryer, according to claim 1, further comprising a plurality of inlet injector tubes that allows air to enter the auger via the heat or cool chamber but remain separated via a divider wall to prevent air from one side of the divider wall from mixing with air on an opposite side of the divider wall. The granular material that enters the heat or cool chamber may concurrently be dried via the lower heating unit with fan blower and the motor. The motor may move the air in the lower heating unit with the fan blower using a plurality of different variations on speeds or timing.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 grain dryer
- 15 grain auger wheel
- 16 grain auger support
- 17 grain auger platform
- 24 motor
- 25 upper fan blower
- 26 lower heating unit with fan blower
- 30 auger
- 31 auger shaft
- 34*a* grain auger housing first portion
- 34*b* grain auger housing second portion
- 35 air escape tunnel
- 36 cover
- 40 swing auger
- 41 swing auger platform
- 42 swing auger support
- 43 transition point
- 45 grain bin
- 46 grain bin wheel
- 47 granular material
- 50 first location
- 55 second location
- 70 first electric motor
- 75 second electric motor
- 80 incoming electrical power
- 85 main controller
- 90 primary switch
- 95 heat temperature control
- 100 air speed control
- 105 heat or cool chamber
- 110 chamber housing
- 115 heating or cooling means
- 120 inlet injector tube
- 125 divider wall
- 130 outlet exhaust tube
- 135 exhaust tube
- 150 auger tube
- 155 auger flighting 1. Description of the Invention The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Figure 1:
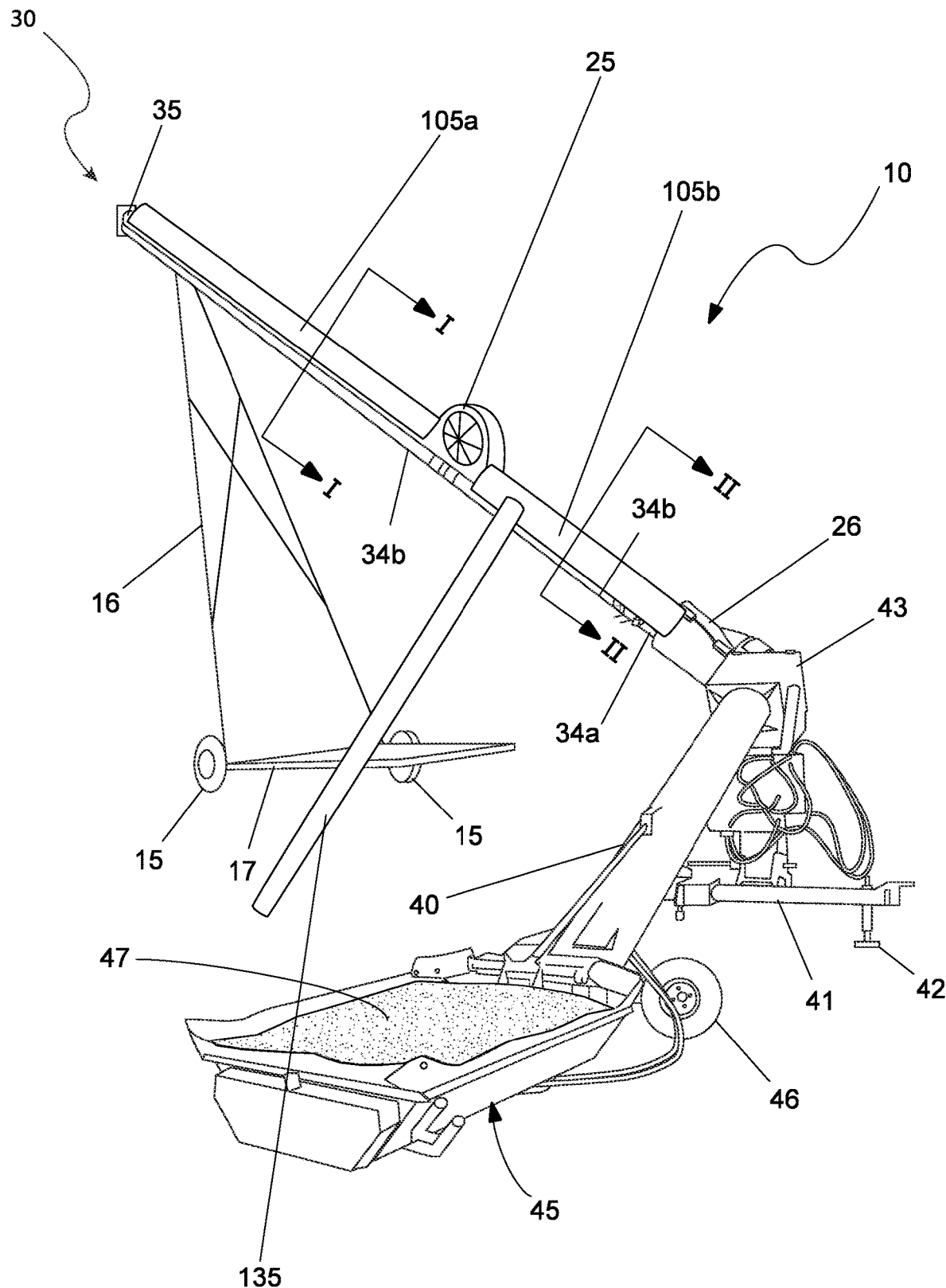
FIG. 1 is an environmental perspective view of a grain dryer, according to the preferred embodiment of the present invention.

The invention comprises a grain dryer 10 that includes enhanced heating and drying capabilities in the form of an in-line heat or cool chamber 105 located near an inlet of the grain dryer 10, a lower heating unit with fan blower 26, similar in nature to those manufactured by Aerotech Herman Nelson International Inc. located immediately upstream from the heat or cool chamber 105, and an upper fan blower 25 positioned at an intermediate location on said grain dryer 10 and downstream of the heat or cool chamber 105. FIG. 1 illustrates a generalized view of the grain dryer 10 as it is fed with granular material 47 by a swing auger 40. Generally speaking, the grain dryer 10 is a machine that transfers granular material 47 from one (1) location, such as a swing auger 40 or a grain bin 35, to a second location, such as a transportation vehicle like a train car or feed truck, or a long-term storage facility such as a silo. It is preferential to dry the granular material 47 as quickly as possible when it is transported and therefore, the grain dryer 10 as described herein allows for enhanced heating and drying that occurs during the transporting of the granular material 47 by the grain dryer 10 from the first location to the second location. Multiple grain dryers 10, each with the aforementioned enhanced heating and drying system, can be combined into scalable processes as desired.

FIG. 1 further describes a generalized overall view of the grain dryer 10 with the enhanced heating and drying system. The illustration depicts a common and generalized process as envisioned. A grain bin 45 is supported on the ground, and can move relative thereto, via at least one (1) grain bin wheel 46. The grain bin 45 has an interior capable of holding a volume of granular material 47 therein. A swing auger 40 includes a swing auger spiral vane traversing an exterior of a swing auger shaft between a first end and a second end. The swing auger shaft is in operable communication with a swing auger drive. The shaft and spiral vane reside within a housing with an inlet in environmental communication with an interior of the grain bin 45, and an outlet. The swing auger shaft first end is also in environmental communication with the interior of the grain bin 45. The outlet housing of the swing auger, as well as the swing auger shaft second end is in environmental communication with the grain dryer 10 via a transition point 43. When the swing auger 40 is operational, it transfers the granular material 47 from the grain bin 45 to the grain dryer 10. The swing auger 40 and swing auger drive is supported on a swing auger platform 41 that is adjustably supported to the ground via at least one (1) swing auger support 42. Alternately, the swing auger 40 may be portable.

The grain dryer 10 includes a grain auger housing first portion 34*a*, having a first end in environmental communication with the transition point 43 and a second end in environmental communication with a first end of the heat or cool chamber 105. A second end of the heat or cool chamber 105 is in environmental communication with a first end of a grain auger housing second portion 34*b*. The heat or cool chamber 105 is "in-line" with the grain auger housing first portion 34*a* and grain auger housing second portion 34*b*. The second end of the grain auger housing second portion 34*b* is in environmental communication with the second location 55 (as shown herein below). The lower heating unit with fan blower 26 is attached to an upper side of the grain auger housing first portion 34*a* and in environmental communication therewith, or in environmental communication directly with the heat or cool chamber 105. The upper fan blower 25 is attached to an intermediate location on an underside of the grain auger housing second portion 34b and in environmental communication with an interior thereof. The grain dryer 10 is preferably supported to a grain auger platform 17 via a plurality of grain auger supports 16, such as trusses, braces, etc. The grain dryer 10 maybe portable via at least one (1) grain auger wheel 15 on the grain auger platform 17. An exhaust tube 135 provides an exit path for air and chaff to escape.

The grain dryer 10 has an auger 30 embodied as a spiral vane traversing an exterior of an auger shaft 31 between a first end and a second end. The auger shaft 31 is in operable communication with a grain auger drive (not shown). The auger 30 and auger shaft 31 reside within the grain auger housing first portion 34a, the heat or cool chamber 105, and the grain auger housing second portion 34b. The first end of the auger shaft 31 is also in environmental communication with the swing auger outlet within the interior of the transition point 43, such that granular material 47 is conveyed therebetween.

Figure 3:
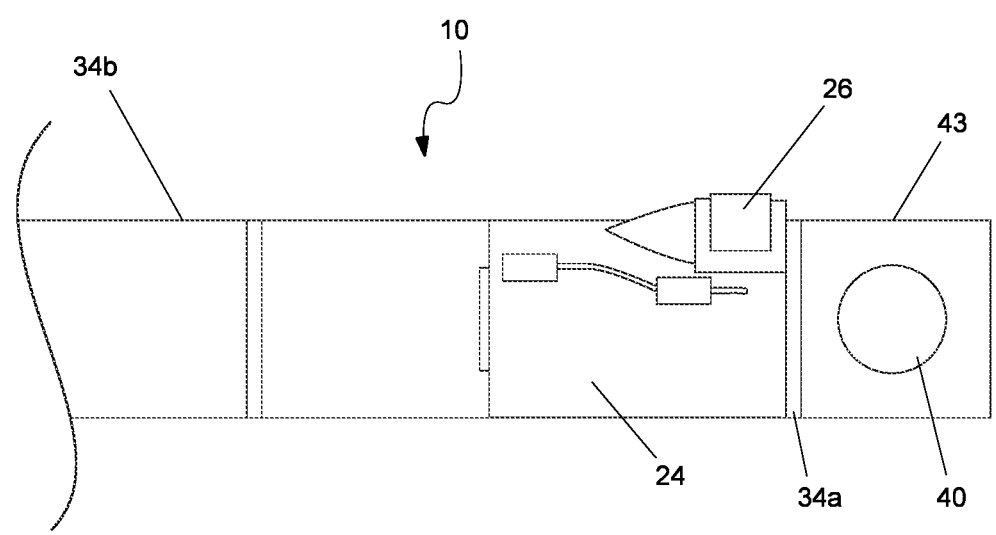
FIG. 3 is a close-up view of the heat or cool chamber, according to the preferred embodiment of the present invention.

Referring now more closely to FIG. 3, depicting a more detailed via of a heat or cool chamber 105. As aforementioned, the transition point 13 has a first end in environmental communication with the second end of the swing auger 40 which conveys granular material 47 thereto via means of a swing auger spiral vane and that is operably driven by a swing auger drive. Immediately attached to and in environmental communication with the second end of the transition point 43 is the first end of the grain auger housing first portion 34a, and the auger shaft 31 and auger 31 (not shown). Attached on the top of the grain auger housing first portion 34a is the lower heating unit with fan blower 26, which is in environmental communication with either the interior of the grain auger housing first portion 34a, the interior of the heat or cool chamber 105, or both.

A motor 24 is in operable communication with a blower (not shown) within the heat or cool chamber 105. The motor 24 and blower are preferably an integral part of the lower heating unit with fan blower 26. The motor 24 may be independently in electrical communication with a power supply or may also be in electrical communication with a common power supply, such as power supply to the grain auger drive or the grain auger drive itself. Granular material 47 that enters the heat or cool chamber 105 is concurrently dried via the lower heating unit with fan blower 26 and the motor 24.

Figure 2A:
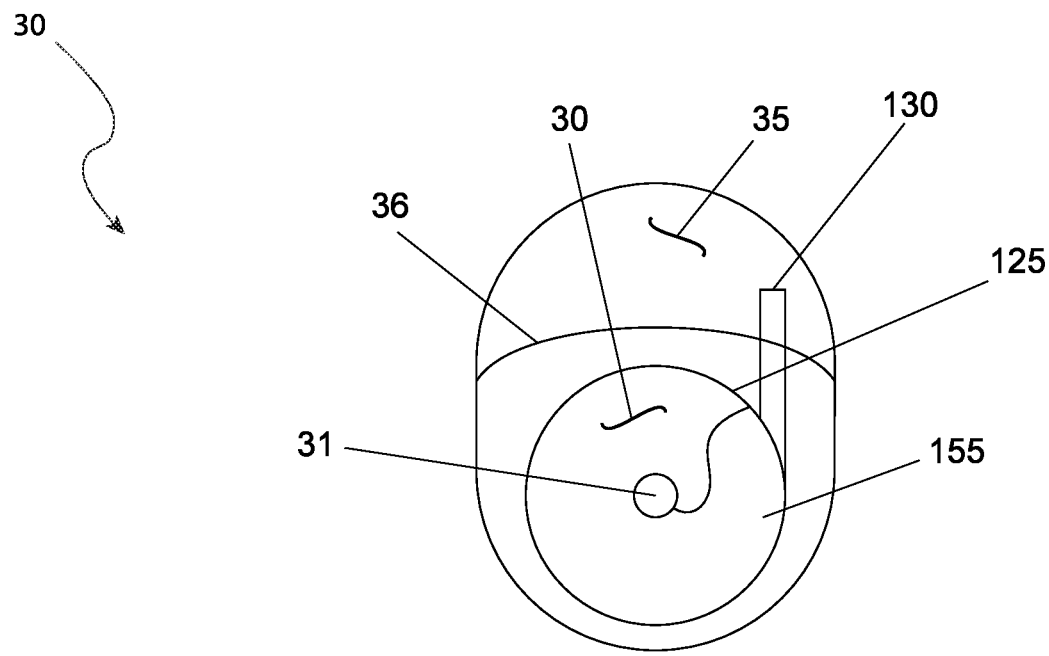
FIG. 2a is a sectional view of the grain dryer, as seen along a Line I-I, as shown in FIG. 1, according to the preferred embodiment of the present invention.

Referring now more closely to FIG. 2a, a sectional view of the grain dryer 10, as seen along a Line I-I, as shown in FIG. 1 is depicted. An auger tube 150 encases the auger 30, consisting of the auger 30, the auger shaft 31 and the auger fighting 155 at a point on the grain auger housing second portion 34b downstream of the upper fan blower 25. The outlet of the upper fan blower 25 is in environmental communication with the interior of the grain auger housing second portion 34b. An air escape tunnel 35 is located on top of a portion of the grain auger housing second portion 34a and is in environmental communication with an interior thereof. A cover 36 separates the air escape tunnel 35 from the auger 30 and may be of a mesh material to prevent material transfer of large particles. A series of outlet exhaust tubes 130 are located on either side of a divider wall 125. Further explanation of the divider wall 125, and the outlet exhaust tubes 130 will be provided herein below.

Figure 2B:
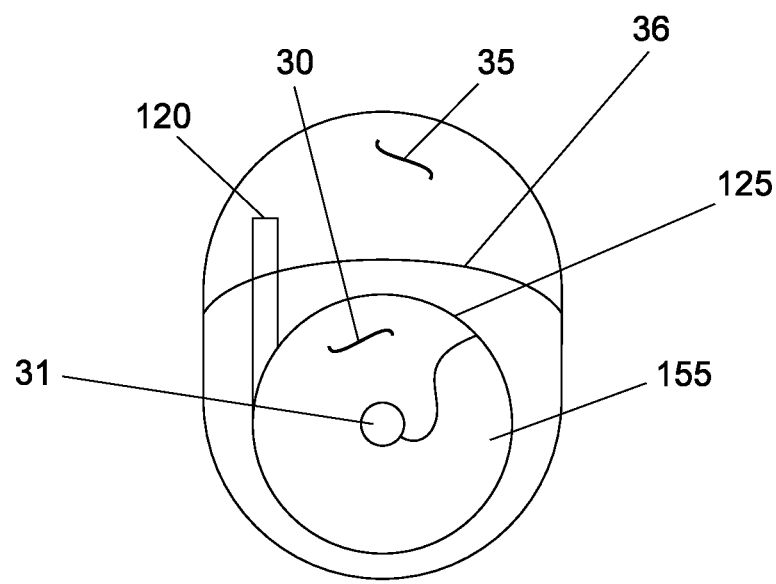
FIG. 2b is a sectional view of the grain dryer, as seen along a Line II-II, as shown in FIG. 1, according to the preferred embodiment of the present invention.

Referring now more closely to FIG. 2b, is shown in a sectional view of the grain dryer 10, as seen along a Line II-II, as shown in FIG. 1 is depicted. The auger tube 150 encases the auger 30, consisting of the auger 30, the auger shaft 31 and the auger fighting 155 at a point on the grain auger housing first portion 34a downstream of lower heating unit with fan blower 26. The outlet of the lower heating unit with fan blower 26 is in environmental communication with the interior of the grain auger housing first portion 34a. An air escape tunnel 35 is located on top of a portion of the grain auger housing first portion 34a an in environmental communication with an interior thereof. A set of outlet exhaust tubes 130 are located on either side of a divider wall 125. Further explanation of the inlet injector tubes 120 and the divider wall 125 will be provided herein below.

The motor 14 can move the air in the lower heating unit with fan blower 26 using different variations on speeds or timing, can be used in a wide variety of grain handling systems. Such systems would range from a movable grain dryer 10 and swing auger 40 that is used to unload a first location, such as a grain bin 45 or a truck or a cart and drying the granular material 47 as it is conveyed to the second location, such as a silo.

It is envisioned that such a grain dryer 10 in at least one (1) embodiment can have coextensive grain auger housing first portion 34a, heat or cool chamber 105, and grain auger housing second portion 34b with a height of sixteen inches (16 in.) and an overall length of eighty to one hundred twenty feet (80-120 ft.). The heat or cool chamber 105 will be able to adjustably heat the interior of the grain dryer 10 for at least forty feet (40 ft.) upstream and capable of reaching sixty feet (60 ft.) with a preferred operating temperature of approximately two hundred degrees Fahrenheit (200° F.). The lower heating unit with fan blower 26 helps to induce a hot flow of air when working simultaneously with the heat or cool chamber 105. The upper fan blower 25 is envisioned to dry and cool off the granular material 47 as it travels the last twenty feet (20 ft.) of the grain dryer 10.

Figure 4:
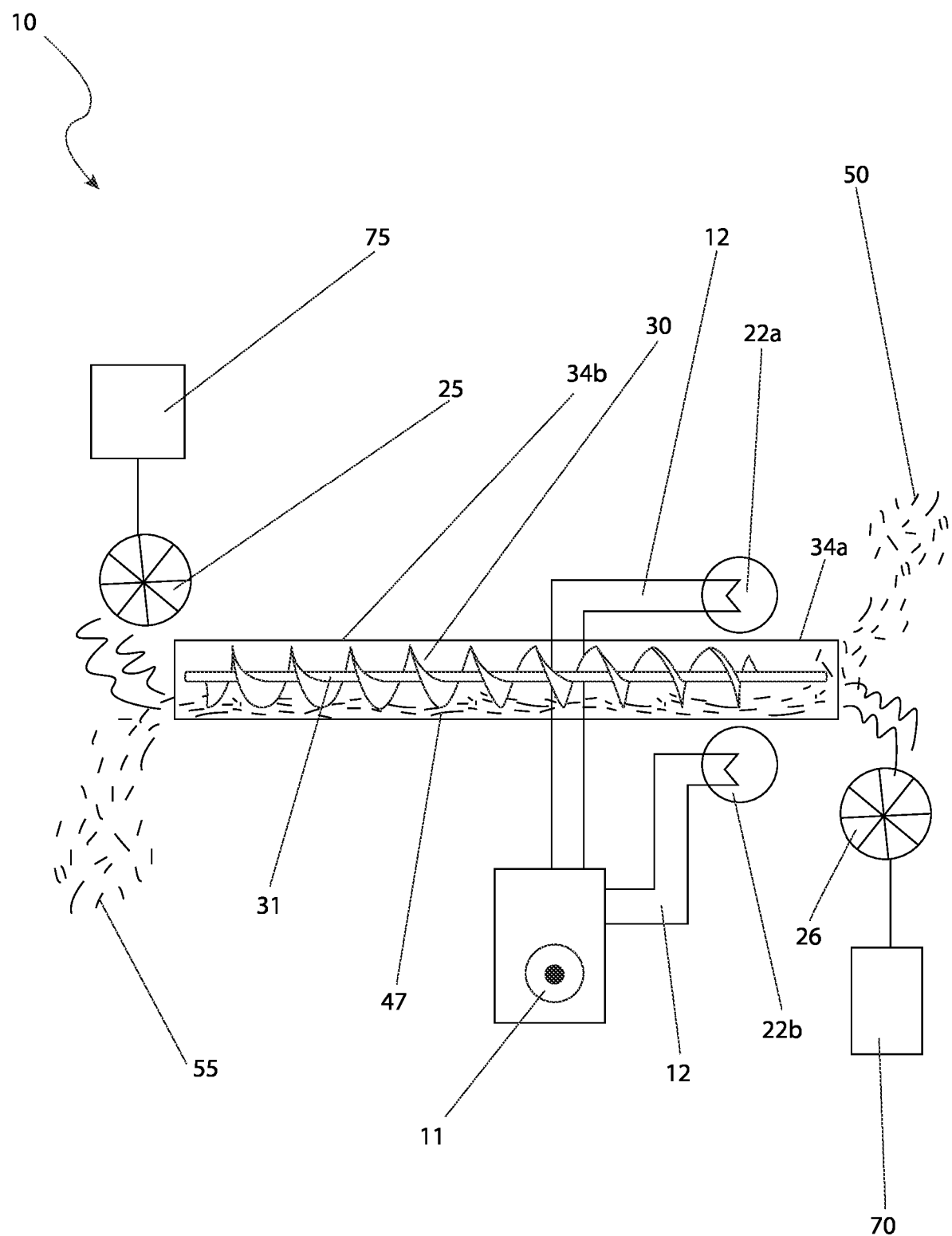
FIG. 4 is a material flow diagram of the grain dryer, according to the preferred embodiment of the present invention.

Referring next to FIG. 4, a material flow diagram of the grain dryer 10, according to the preferred embodiment of the present invention is disclosed. The grain dryer 10 houses the auger 30 and the associated auger shaft 31. As aforementioned described, the grain dryer 10 moves granular mater 47 from a first location 50 to a second location 55, using the auger 30 in a customary manner. Heat transfer is assisted with the use of the lower heating unit with fan blower 26 and the upper fan blower 25. The lower heating unit with fan blower 26 is mechanically powered by a first motor 70. Likewise, the upper fan blower 25 is mechanically powered by a second motor 75. As such, the granular material 47 at the second location 55 is of a much lower moisture content than that found as the first location 50.

Figure 5:
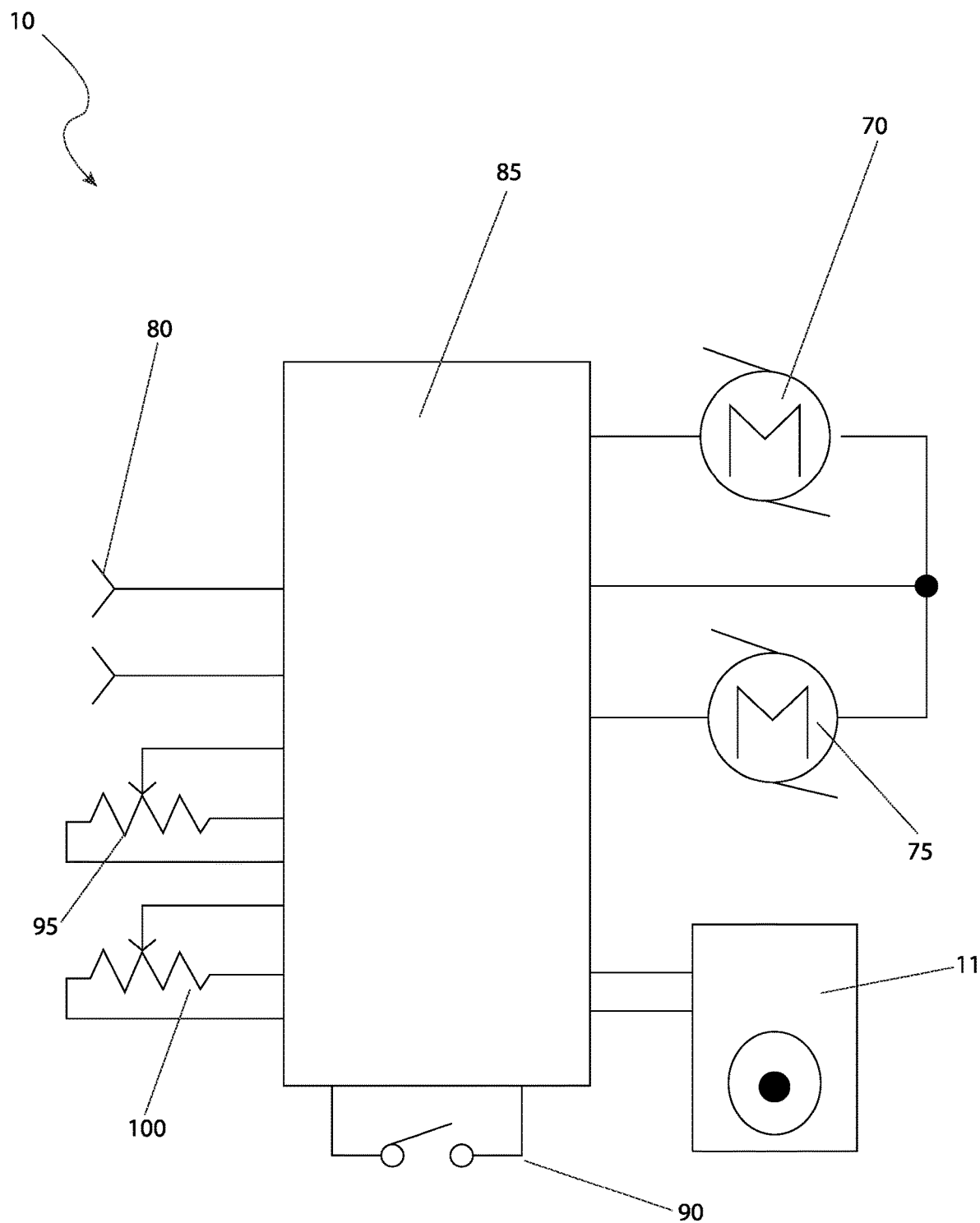
FIG. 5 is an electrical block diagram of the grain dryer, according to the preferred embodiment of the present invention.

Referring now to FIG. 5, an electrical block diagram of the grain dryer 10, according to the preferred embodiment of the present invention is depicted. Incoming electrical power 80 is introduced into a main controller 85. The main controller 85 is provided with multiple user controls including, but not limited to, a primary switch 90 which controls total system operation. A heat temperature control 95 controls the output of the lower heating unit with fan blower 26. Finally, an air speed control 100 provides for simultaneous speed control of the first electric motor 70 and the second electric motor 75.

Figure 6:
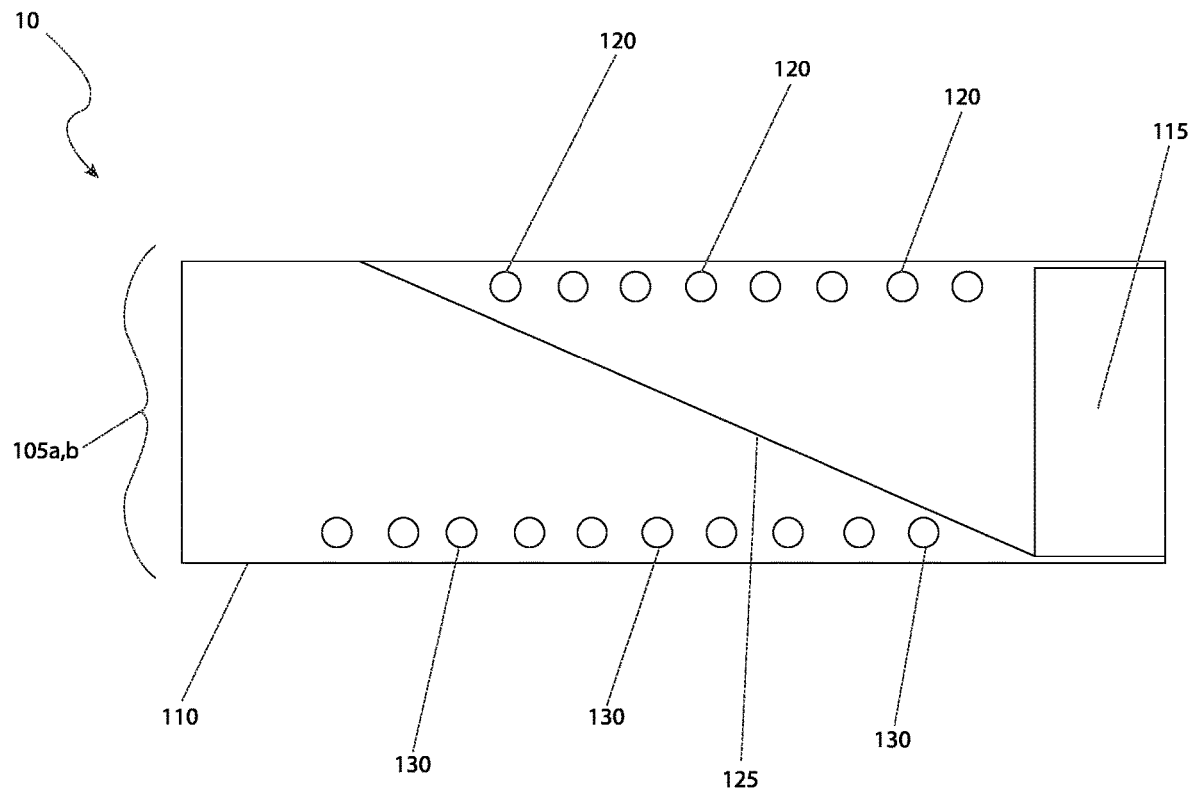
FIG. 6 is a pictorial diagram of the heat and cool chamber, as used with the grain dryer, according to the preferred embodiment of the present invention.

Referring finally to FIG. 6, a pictorial diagram of the heat and cool chamber 105, as used with the grain dryer 10, according to the preferred embodiment of the present invention is shown. A chamber housing 110 is provided with the approximate dimensions of twenty to thirty feet (20-30 feet) and a diameter of sixteen inches (16 in.). It is noted that multiple heat or cool chambers 105 would be used with the grain dryer 10 and would be used for both heating and cooling means using the same methodology via separate independent units. A heating or cooling means 115 is located at one (1) end of the chamber housing 110. A plurality of inlet injector tubes 120 allows air to enter the auger 30 (as shown in FIG. 1), via the chamber housing 110, but remain separated via a divider wall 125. The divider wall 125 prevents air from one (1) side of the divider wall 125 from mixing with the air on the opposite side of the divider wall 125. In a similar manner to the inlet injector tubes 120, a plurality of the outlet exhaust tubes 130 provide a means for exhaust air to escape the heat or cool chamber 105. The heating or cooling means 115 may be a device such as a heating coil, a cooling fan, a cooling coil, or the like. The use of any specific type of heating or cooling means 115 is not intended to be a limiting factor of the present invention.

The materials required to produce the grain dryer 10 are all readily available and well known to manufacturers of goods of this type. The individual components of the invention exist; however, the skills of an engineering team would be necessary to determine the exact operating parameters, temperatures, blower 25, 26 speeds, auger 30 speeds, and the like. The remaining components of the present invention such as the upper fan blower 25, lower heating unit with fan blower 26, motors 24, and the like, would best be procured from manufacturers and wholesalers that deal in goods of that nature and assembled at a final location. The relatively simple design of the invention and the material of construction make grain heating and drying a cost-effective design due to the relatively low material and labor costs involved. Production of the grain dryer 10 will be performed by manufacturing workers of average skill.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A grain dryer, comprising:
    a grain bin adapted to be supported on a ground surface, the grain bin having an interior holding a plurality of granular material therein;
    a swing auger having a swing auger spiral vane traversing an exterior of a swing auger shaft between a first end and a second end of the swing auger shaft, the swing auger transfers the granular material from the grain bin to the grain dryer;
    a swing auger drive operably communicating with the swing auger shaft;
    a swing auger platform supporting the swing auger and the swing auger drive that is adjustably supported to the ground surface via at least one swing auger support;
    a grain auger housing first portion having a first end in environmental communication with a transition point and a second end in environmental communication with a first end of a heat or cool chamber, a second end of the heat or cool chamber is in environmental communication with a first end of a grain auger housing second portion; and
    a motor disposed within the heat or cool chamber, the motor is an integral part of a lower heating unit with fan blower.

2. The grain dryer, according to claim 1, wherein the grain bin includes at least one grain bin wheel to move the grain bin.

3. The grain dryer, according to claim 1, wherein the swing auger shaft and the swing auger spiral vane reside are within a housing having an inlet in environmental communication with the interior of the grain bin and an outlet.

4. The grain dryer, according to claim 3, wherein the swing auger shaft first end is in environmental communication with the interior of the grain bin.

5. The grain dryer, according to claim 3, wherein the housing of the swing auger spiral vane and the swing auger shaft second end are in environmental communication with the grain dryer via the transition point.

6. The grain dryer, according to claim 1, wherein the swing auger is portable.

7. The grain dryer, according to claim 1, wherein the heat or cool chamber is in-line with the grain auger housing first portion and the grain auger housing second portion.

8. The grain dryer, according to claim 1, further comprising the lower heating unit with fan blower is attached to an upper side of the grain auger housing first portion and is in environmental communication with the heat or cool chamber.

9. The grain dryer, according to claim 8, wherein attached on top of the grain auger housing first portion is the lower heating unit with fan blower, which is in environmental communication with either the interior of the grain auger housing first portion, the interior of the heat or cool chamber, or both.

10. The grain dryer, according to claim 8, wherein the lower heating unit with fan blower is attached to an intermediate location on an underside of the grain auger housing second portion and is in environmental communication with an interior thereof.

11. The grain dryer, according to claim 1, wherein the grain dryer is supported to a grain auger platform via a plurality of grain auger supports.

12. The grain dryer, according to claim 11, wherein the grain auger supports includes a plurality of trusses or a plurality of braces.

13. The grain dryer, according to claim 11, wherein the grain auger platform includes at least one grain auger wheel.

14. The grain dryer, according to claim 1, further comprising an air escape tunnel is located on top of a portion of the grain auger housing second portion and is in environmental communication with an interior thereof.

15. The grain dryer, according to claim 1, further comprising a cover that separates an air escape tunnel from the auger.

16. The grain dryer, according to claim 15, wherein the cover is made of a mesh material to prevent material transfer of a plurality of large particles.

17. The grain dryer, according to claim 1, further comprising a series of outlet exhaust tubes located on either side of a divider wall.

18. The grain dryer, according to claim 1, further comprising a plurality of inlet injector tubes that allows air to enter the auger via the heat or cool chamber but remain separated via a divider wall to prevent air from one side of the divider wall from mixing with air on an opposite side of the divider wall.

19. The grain dryer, according to claim 1, wherein the granular material that enters the heat or cool chamber is concurrently dried via the lower heating unit with fan blower and the motor.

20. The grain dryer, according to claim 1, wherein the motor moves the air in the lower heating unit with fan blower using a plurality of different variations on speeds or timing.

* * * * *